(12) United States Patent
Fijolek et al.

(10) Patent No.: US 6,510,162 B1
(45) Date of Patent: Jan. 21, 2003

(54) SYSTEM AND METHOD FOR MANAGING CHANNEL USAGE IN A DATA OVER CABLE SYSTEM

(75) Inventors: John G. Fijolek, Naperville, IL (US); Nurettin B. Beser, Evanston, IL (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/090,593

(22) Filed: May 27, 1998

(51) Int. Cl.[7] .............................. H04J 3/16; H04J 3/22; H04H 1/04; G06F 15/173
(52) U.S. Cl. .................. 370/432; 370/469; 370/486; 709/223; 709/239; 709/225
(58) Field of Search ................................. 370/432, 401, 370/400, 404, 389, 202, 485, 486, 469; 395/200.68, 200.57, 200.61, 200.66, 200.75; 709/223, 224, 225, 239

(56) References Cited

U.S. PATENT DOCUMENTS

| | | | |
|---|---|---|---|
| 4,644,533 A | 2/1987 | Braff et al. ..................... 370/94 |
| 4,881,263 A | 11/1989 | Herbison et al. ............. 380/21 |
| 4,996,685 A | 2/1991 | Farese et al. ............... 370/58.1 |
| 5,014,234 A | 5/1991 | Edwards, Jr. ............... 364/900 |
| 5,138,712 A | 8/1992 | Corbin ....................... 395/700 |
| 5,301,273 A | 4/1994 | Konishi ....................... 395/200 |
| 5,347,304 A | 9/1994 | Moura et al. |
| 5,430,727 A | 7/1995 | Callon ..................... 370/85.13 |
| 5,442,749 A | 8/1995 | Northcutt et al. ....... 395/200.09 |
| 5,488,412 A | * 1/1996 | Majeti et al. .................. 348/10 |
| 5,489,897 A | 2/1996 | Inoue ................... 340/870.39 |
| 5,583,931 A | 12/1996 | Schneider et al. |
| 5,586,121 A | * 12/1996 | Moura et al. ................ 370/404 |
| 5,598,410 A | 1/1997 | Stone ......................... 370/469 |
| 5,600,717 A | 2/1997 | Schneider et al. |
| 5,606,606 A | 2/1997 | Schneider et al. |
| 5,608,446 A | 3/1997 | Carr et al. |
| 5,610,910 A | 3/1997 | Focsaneanu et al. ......... 370/351 |
| 5,623,542 A | 4/1997 | Schneider et al. |
| 5,623,601 A | 4/1997 | Vu ........................ 395/187.01 |

(List continued on next page.)

OTHER PUBLICATIONS

"Radio Frequency Interface Specification (Interim Specification) SP–RFI–I05–991105", MCNS Holdings, L.P., 1999, pp. ii to 202.

(List continued on next page.)

Primary Examiner—Wellington Chin
Assistant Examiner—M. Phan
(74) Attorney, Agent, or Firm—McDonnell Boehnen Hulbert & Berghoff

(57) ABSTRACT

A system and method for managing the data channel usage in a data over cable system having more than one data channel. The system includes network devices, which are cable modems connected in at least a downstream connection to one of the data channels in a cable network. The upstream connection to the cable modem may be to the cable network or to alternative networks such as, the public switched telephone network. During initialization, the cable modems attempt to communicate over a channel designated for it in the configuration parameters provided for the cable modems. If unable to use the channel, or if no channel has yet been defined for it, the cable modem scans the bandwidth for an available data channel. The cable modem may lock on the first found data channel. The cable modems register with the cable network and are assigned to a cluster. The user of a network administrator analyzes channel usage and moves cable modems to different channels in clusters. When a cable modem is moved to a different data channel, it is restarted. The restart may wait until the cable modem is inactive if it is issued when the cable modem is communicating data. The wait time may be set to a maximum camp-on time.

18 Claims, 7 Drawing Sheets

U.S. PATENT DOCUMENTS

| | | | |
|---|---|---|---|
| 5,636,211 A | 6/1997 | Newlin et al. | |
| 5,675,732 A | 10/1997 | Majeti et al. | |
| 5,675,742 A | 10/1997 | Jain et al. | 395/200 |
| 5,678,041 A | 10/1997 | Baker et al. | 395/609 |
| 5,708,654 A | 1/1998 | Arndt et al. | 370/242 |
| 5,710,885 A | 1/1998 | Bondi | 709/224 |
| 5,723,510 A | 3/1998 | Arndt et al. | 395/200.5 |
| 5,761,602 A | 6/1998 | Wagner et al. | 455/3.1 |
| 5,778,181 A | 7/1998 | Hidary et al. | 395/200.48 |
| 5,790,198 A | 8/1998 | Roop et al. | 348/460 |
| 5,790,548 A | 8/1998 | Sistanizadeh et al. | 370/401 |
| 5,790,677 A | 8/1998 | Fox et al. | 380/24 |
| 5,790,770 A | 8/1998 | McClure et al. | 395/200.61 |
| 5,790,806 A | 8/1998 | Koperda | 395/200.82 |
| 5,793,747 A | 8/1998 | Kline | 370/230 |
| 5,799,086 A | 8/1998 | Sudia | 380/23 |
| 5,805,804 A | 9/1998 | Laursen et al. | 348/7 |
| 5,809,252 A * | 9/1998 | Mohammed et al. | 395/200.57 |
| 5,818,845 A | 10/1998 | Moura et al. | 370/449 |
| 5,819,028 A | 10/1998 | Manghirmalani et al. | 395/185.1 |
| 5,819,042 A | 10/1998 | Hansen | 714/756 |
| 5,828,655 A | 10/1998 | Moura et al. | 370/326 |
| 5,828,666 A | 10/1998 | Focsaneanu et al. | 370/389 |
| 5,835,720 A | 11/1998 | Nelson et al. | 395/200.54 |
| 5,835,727 A * | 11/1998 | Wong et al. | 395/200.68 |
| 5,841,777 A | 11/1998 | Cohen | 370/433 |
| 5,848,233 A | 12/1998 | Radia et al. | 395/187.01 |
| 5,852,721 A | 12/1998 | Dillon et al. | 395/200.47 |
| 5,854,901 A | 12/1998 | Cole et al. | 709/245 |
| 5,859,852 A | 1/1999 | Moura et al. | 370/449 |
| 5,864,679 A | 1/1999 | Kanai et al. | 709/238 |
| 5,870,134 A | 2/1999 | Laubach et al. | 348/12 |
| 5,872,523 A | 2/1999 | Dellaverson et al. | 340/825.52 |
| 5,892,754 A | 4/1999 | Kompella et al. | 370/230 |
| 5,894,479 A | 4/1999 | Mohammed | 370/401 |
| 5,903,558 A | 5/1999 | Jones et al. | 370/351 |
| 5,909,549 A | 6/1999 | Compliment et al. | 709/223 |
| 5,913,037 A | 6/1999 | Spofford et al. | 395/200.56 |
| 5,915,119 A | 6/1999 | Cone | 395/750.02 |
| 5,922,049 A | 7/1999 | Radia et al. | 709/220 |
| 5,922,051 A | 7/1999 | Sidey | 709/223 |
| 5,923,659 A | 7/1999 | Curry et al. | 370/401 |
| 5,926,458 A | 7/1999 | Yin | 370/230 |
| 5,943,604 A | 8/1999 | Chen et al. | 455/5.1 |
| 5,954,797 A | 9/1999 | Sidey | 709/223 |
| 5,958,007 A | 9/1999 | Lee et al. | 709/219 |
| 5,982,748 A | 11/1999 | Yin et al. | 370/232 |
| 5,987,524 A | 11/1999 | Yoshida et al. | 709/245 |
| 5,991,292 A | 11/1999 | Focsaneanu et al. | 370/352 |
| 5,991,306 A | 11/1999 | Burns et al. | 370/429 |
| 5,999,536 A | 12/1999 | Kawafuji et al. | 370/401 |
| 6,003,077 A | 12/1999 | Bawden et al. | 709/223 |
| 6,005,851 A | 12/1999 | Craddock et al. | 370/329 |
| 6,006,264 A | 12/1999 | Colby et al. | 709/226 |
| 6,009,103 A * | 12/1999 | Woundy | 370/401 |
| 6,104,545 A * | 1/2000 | Wu et al. | 455/3.1 |
| 6,031,841 A | 2/2000 | Woundy | 370/410 |
| 6,041,041 A | 3/2000 | Ramanathan et al. | 370/241 |
| 6,046,979 A | 4/2000 | Bauman | 370/229 |
| 6,049,546 A | 4/2000 | Ramakrishnan | 370/412 |
| 6,049,825 A | 4/2000 | Yamamoto | 709/221 |
| 6,049,826 A | 4/2000 | Beser | 709/222 |
| 6,052,724 A | 4/2000 | Willie et al. | 709/223 |
| 6,058,421 A * | 5/2000 | Fijolek et al. | 709/225 |
| 6,061,349 A | 5/2000 | Coile et al. | 370/389 |
| 6,065,049 A | 5/2000 | Beser | 709/218 |
| 6,070,187 A | 5/2000 | Subramaniam et al. | 709/220 |
| 6,070,242 A | 5/2000 | Wong et al. | 713/201 |
| 6,070,246 A | 5/2000 | Beser | 713/201 |
| 6,073,178 A | 6/2000 | Wong et al | 709/229 |
| 6,075,787 A | 6/2000 | Bobeck et al. | 370/395 |
| 6,091,709 A | 7/2000 | Harrison et al. | 370/235 |
| 6,094,431 A | 7/2000 | Yamato et al. | 370/395 |
| 6,104,700 A | 8/2000 | Haddock et al. | 370/235 |
| 6,112,258 A | 8/2000 | Miller et al. | 710/19 |
| 6,122,254 A | 9/2000 | Aydemir et al. | 370/235 |
| 6,128,298 A | 10/2000 | Wootton et al. | 370/392 |
| 6,130,879 A | 10/2000 | Liu | 370/230 |
| 6,130,880 A | 10/2000 | Naudus et al. | 370/235 |
| 6,137,792 A | 10/2000 | Jonas et al. | 370/354 |
| 6,137,793 A | 10/2000 | Gorman et al. | 370/360 |
| 6,148,410 A | 11/2000 | Baskey et al. | 714/4 |
| 6,157,965 A * | 12/2000 | Mohanned et al. | 710/8 |
| 6,170,061 B1 | 1/2001 | Beser | 713/201 |
| 6,178,455 B1 | 1/2001 | Schutte et al. | 709/228 |
| 6,185,624 B1 * | 2/2001 | Fijolek et al. | 709/239 |
| 6,189,102 B1 | 2/2001 | Beser | 713/201 |
| 6,208,656 B1 | 3/2001 | Hrastar et al. | 370/401 |
| 6,212,563 B1 | 4/2001 | Beser | 709/227 |
| 6,216,171 B1 | 4/2001 | Isono et al. | 709/250 |
| 6,223,222 B1 | 4/2001 | Fijolek et al. | 709/227 |
| 6,240,464 B1 | 5/2001 | Fijolek et al. | 709/250 |
| 6,260,072 B1 | 7/2001 | Rodriguez-Moral | 709/241 |
| 6,269,099 B1 | 7/2001 | Borella et al. | 370/389 |
| 6,272,150 B1 * | 8/2001 | Hrastar et al. | 370/486 |
| 6,275,853 B1 * | 8/2001 | Beser et al. | 709/223 |
| 6,295,554 B1 | 9/2001 | Karadogan | 709/219 |
| 6,301,223 B1 | 10/2001 | Hrastar et al. | 370/227 |
| 6,301,618 B1 | 10/2001 | Sitaraman et al. | 709/227 |
| 6,308,328 B1 | 10/2001 | Bowcutt et al. | 725/111 |
| 6,331,987 B1 | 12/2001 | Beser | 370/486 |
| 6,332,163 B1 | 12/2001 | Bowman-Amuah | 7409/231 |
| 6,337,858 B1 | 1/2002 | Petty et al. | 370/356 |
| 6,351,773 B1 | 2/2002 | Fijolek et al. | 709/228 |
| 6,370,147 B1 | 4/2002 | Beser | 370/401 |

OTHER PUBLICATIONS

"Radio Frequency Interface Specification (Interim Specification) SP–RFIv1.1–I06–001215", MCNS Holdings, L.P., 2000, pp. ii to 432.

"Radio Frequency Interface Specification (Interim Specification) SP–RFI–I04–980724", MCNS Holdings, L.P., 1997, pp. ii to 196.

Kyees, P.J. et al., *ADSL: A New Twisted–Pair Access to the Information Highway,* IEEE Communications Magazine, vol. 33, Issue 4, Apr. 1995, pp. 52–60.

Huang, Yin–Hwa et al., *Design of an MPEG–Based Set–Top Box for Video on Demand Services,* Acoustics, Speech, and Signal Processing, 1995, ICASSP–95., 1995 International Conference, vol. 4, ISBN: 0–7803–2431–5, May 9–12, 1995, pp. 2655–2658.

"A Solution for the Priority Queue Problem of Deadline–Ordered Service Disciplines," N.R. Figueira, IEEE International Conference on Computer Communications and Networks, Sep. 22–25, 1997, pp. 320–325.

"Cable Modem to Customer Premise Equipment Interface Specification (Interim) SP–CMCI–I02–980317", Multimedia Cable Network System (MCNS) Holdings, L.P., 1998, pp. ii to 40.

"Operations Support System Interface Specification Baseline Privacy Interface MIB (Interim) SP–OSSI–B-PI–I01–980331", MCNS Holdings, L.P., 1998, pp. ii to 33.

"Cable Modem Termination System–Network Side Interface Specification (Interim Specification) SP–CMTS–N-SII01–960702", MCNS Holdings, L.P., 1996, pp. ii to 13.

"Removable Security Module Interface Specification (Interim Specification) SP–RSMI–I01–980204", MCNS Holdings, L.P., 1997, pp. ii to 48.

"Baseline Privacy Interface Specification (Interim) SP–B-PI–I01–970922", MCNS Holdings, L.P., 1997, pp. ii to 66.

"Operations Support System Interface Specification (Interim) SP–OSSII01–970403", MCNS Holdings, L.P., 1997, pp. 1 to 30.

"Radio Frequency Interface Specification (Interim Specification) SP–RFI–I02–971008", MCNS Holdings, L.P., 1997, pp. ii to 186.

"Cable Modem Telephony Return Interface Specification (Interim) SP–CMTRI–I01–970804", MCNS Holdings, L.P., 1997, pp. ii to 74.

"Security System Specification (Interim Specification) SP–SSI–I01–970506", MCNS Holdings, L.P., 1997, pp. ii to 103.

"Internet Engineering Task Force, Request for Comments 2131, Dynamic Host Configuration Protocol (DHCP)", Mar. 1997, pp. 1 to 42.

S. Adiraju, J. Fijolek, IPCDN Telephony Return MIB, Internet Engineering Task Force, "≦draft–ietf–ipcdn–tri–mib–00.1.txt≧," Mar. 23, 1998, pp. 1 to 26.

* cited by examiner

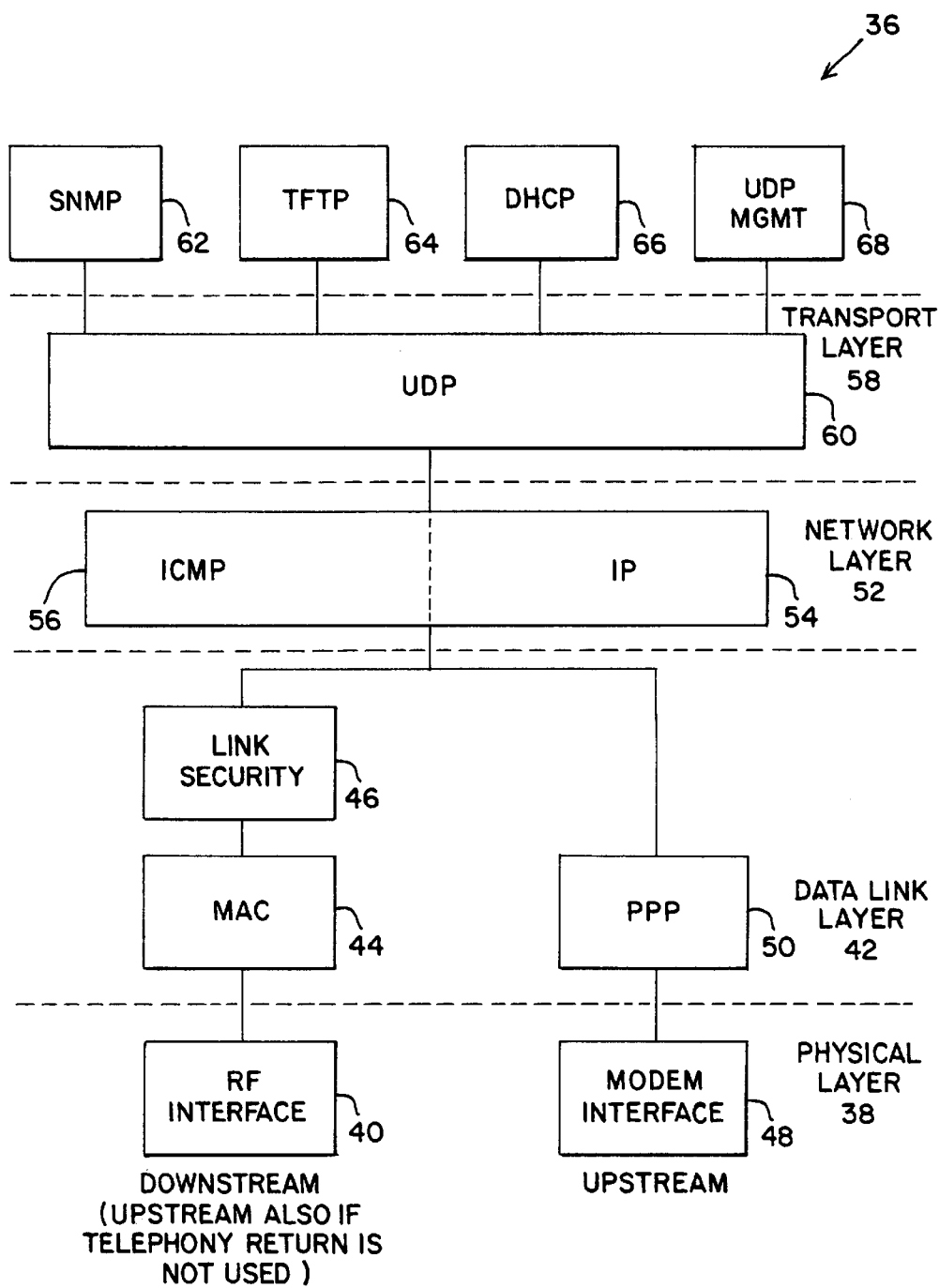

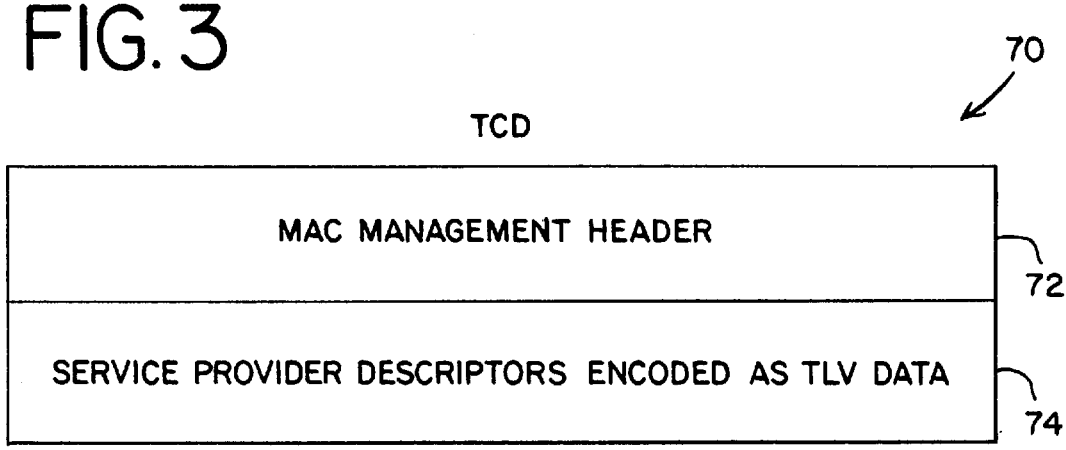
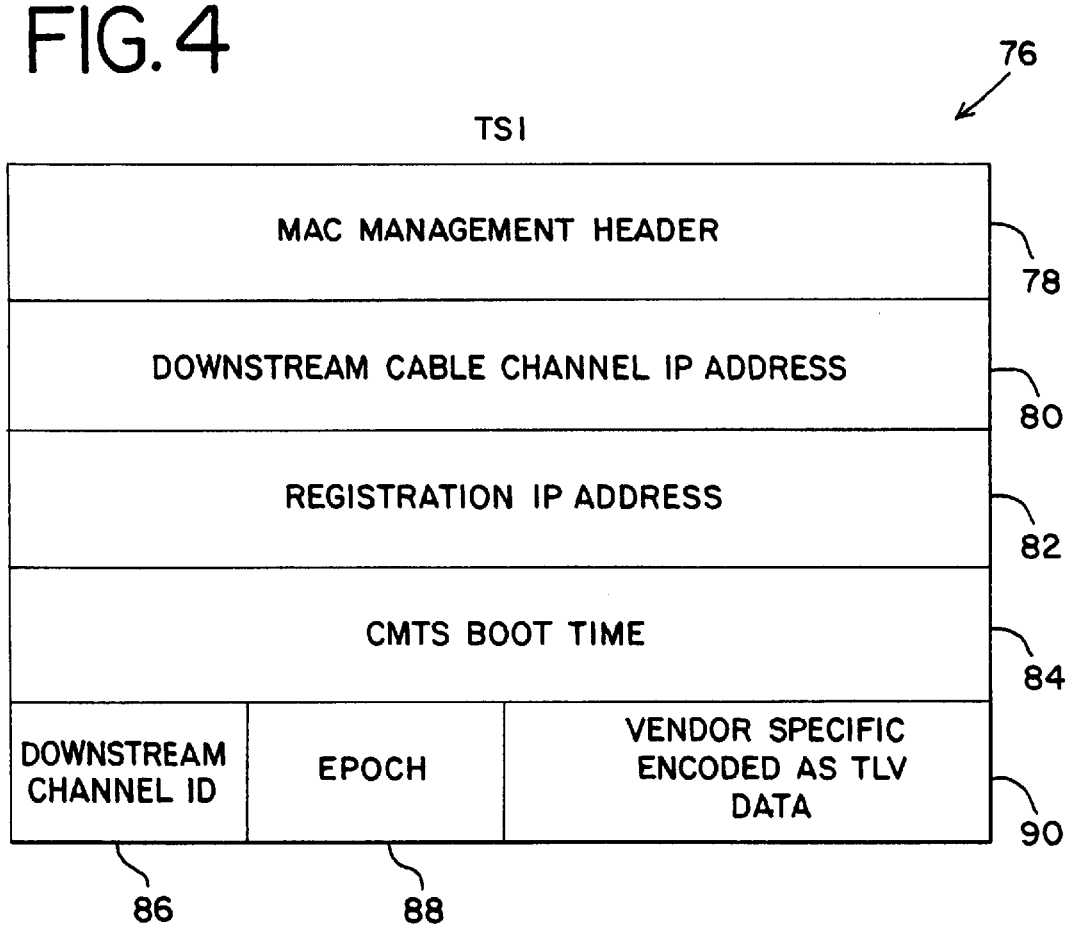

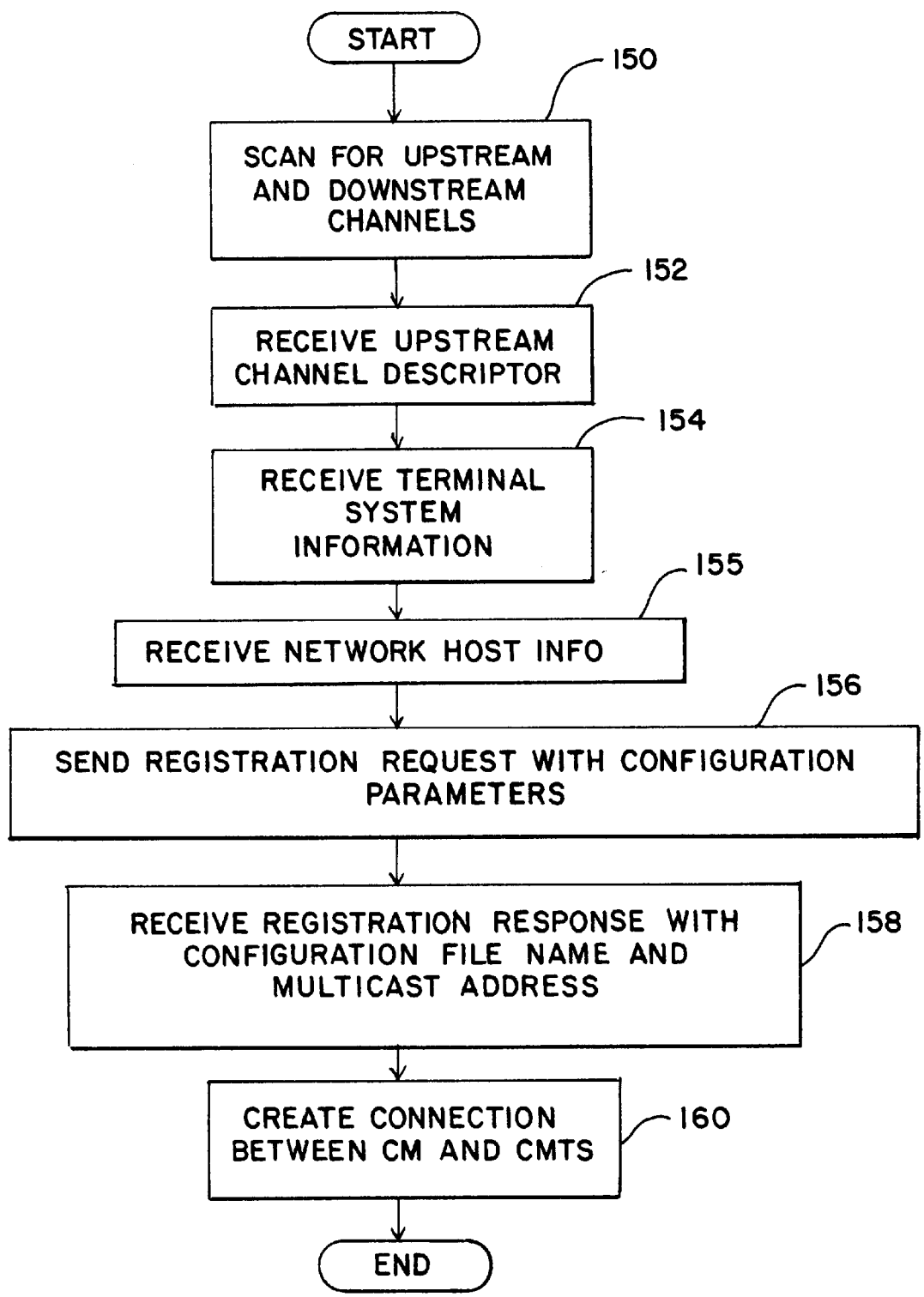

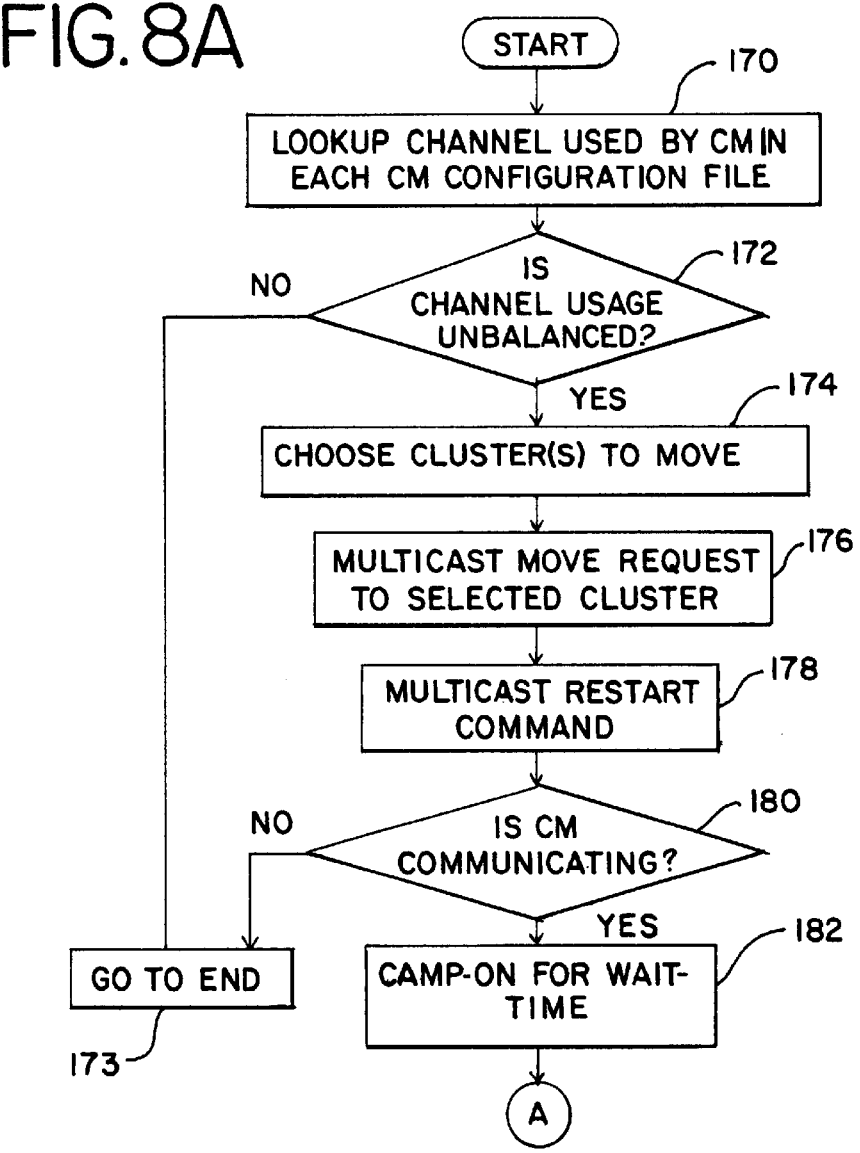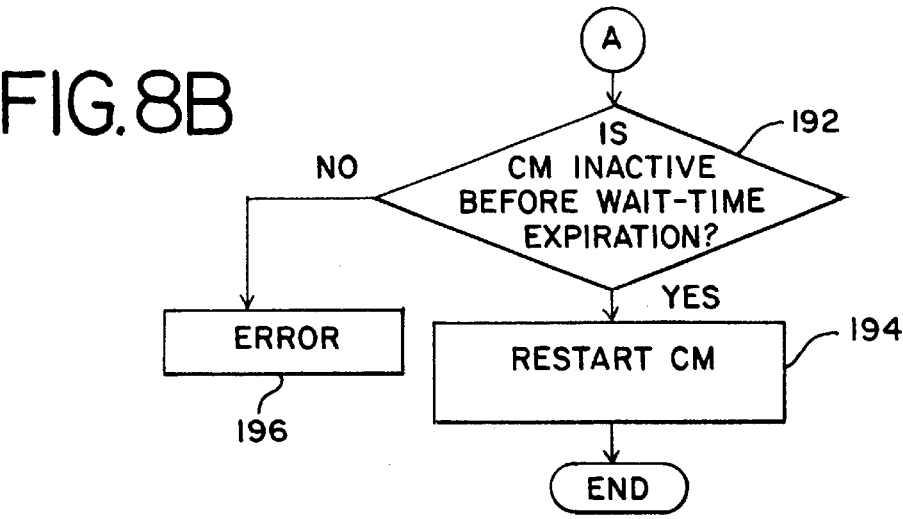

SYSTEM AND METHOD FOR MANAGING CHANNEL USAGE IN A DATA OVER CABLE SYSTEM

BACKGROUND OF THE INVENTION

A. Field of the Invention

The present invention relates to the field of network communications, and more particularly to cable modem network management.

B. Background of the Invention

Cable television networks such as those provided by Comcast Cable Communications, Inc., of Philadelphia, Pa., Cox Communications of Atlanta Ga., Tele-Communications, Inc., of Englewood Colo., Time-Warner Cable, of Marietta Ga., Continental Cablevision, Inc., of Boston Mass., and others provide cable television services to a large number of subscribers over a large geographical area. The cable television networks typically are interconnected by cables such as coaxial cables or a Hybrid Fiber/Coaxial ("HFC") cable system which have data rates of about 10 Mega-bits-per-second ("Mbps") to 30+ Mbps.

The Internet, a world-wide-network of interconnected computers, provides multi-media content including audio, video, graphics and text that require a large bandwidth for downloading and viewing. Most Internet Service Providers ("ISPs") allow customers to connect to the Internet via a serial telephone line from a Public Switched Telephone Network ("PSTN") at data rates including 14,400 bps, 28,800 bps, 33,600 bps, 56,000 bps and others that are much slower than the about 10 Mbps to 30+ Mbps available on a coaxial cable or HFC cable system on a cable television network.

With the explosive growth of the Internet, many customers have desired to use the larger bandwidth of a cable television network to connect to the Internet and other computer networks. Cable modems, such as those provided by 3Com Corporation of Santa Clara, Calif., Motorola Corporation of Arlington Heights, Ill., Hewlett-Packard Co. of Palo Alto, Calif., Bay Networks of Santa Clara, Calif., Scientific-Atlanta, of Norcross, Ga. and others offer customers higher-speed connectivity to the Internet, an intranet, Local Area Networks ("LANs") and other computer networks via cable television networks. These cable modems currently support a data connection to the Internet and other computer networks via a cable television network with a data rate of up to 30+ Mbps which is a much larger data rate than can be supported by a modem used over a serial telephone line.

However, most cable television networks provide only unidirectional cable systems, supporting only a "downstream" data path. A downstream data path is the flow of data from a cable system "headend" to a customer. A cable system headend is a central location in the cable television network that is responsible for sending cable signals in the downstream direction. A return data path via a telephone network, such as a public switched telephone network provided by AT&T and others, (i.e., a "telephony return") is typically used for an "upstream" data path. An upstream data path is the flow of data from the customer back to the cable system headend. A cable television system with an upstream connection to a telephony network is called a "data-over-cable system with telephony return."

An exemplary data-over-cable system with telephony return includes customer premise equipment (e.g., a customer computer), a cable modem, a cable modem termination system, a cable television network, a public switched telephone network, a telephony remote access concentrator and a data network (e.g., the Internet). The cable modem termination system and the telephony remote access concentrator together are called a "telephony return termination system."

The cable modem termination system receives data packets from the data network and transmits them downstream via the cable television network to a cable modem attached to the customer premise equipment. The customer premise equipment sends response data packets to the cable modem, which sends response data packets upstream via public switched telephone network to the telephony remote access concentrator, which sends the response data packets back to the appropriate host on the data network.

When a cable modem used in the data-over-cable system with telephony return is initialized, a connection is made to both the cable modem termination system via the cable network and to the telephony remote access concentrator via the public switched telephone network. As a cable modem is initialized, it will initialize one or more downstream channels (i.e., downstream connections) to the cable modem termination system via the cable network or the telephony remote access concentrator via the public switched telephone network.

As a cable modem is initialized in a data-over-cable system, it registers with a cable modem termination system to allow the cable modem to receive data over a cable television connection and from a data network (e.g., the Internet or an Intranet). The cable modem forwards configuration information it receives in a configuration file during initialization to the cable modem termination system as part of a registration request message.

The cable modem termination system may initialize a large number of cable modems over a selected portion of the bandwidth. A cable system may use several cable modem termination systems connected to a large number of cable modems to provide service over a larger portion of the bandwidth. A cable system may be connected to as many as tens of thousands of cable modems.

During initialization, each cable modem scans for available channels. Typically, the cable modems scan the channels on the network sequentially starting from one end of the spectrum. Cable modems may also scan the network randomly. Once the cable modems are initialized, the usage of the spectrum may end up unbalanced with many cable modems locked on the same channel or a few channels that are near each other on the spectrum.

The imbalance may degrade system throughput. A small number of data channels carries the majority of the communications traffic while other channels are under-used. A cable system administrator may prefer to keep channel usage balanced across the spectrum. During operation, each cable modem may be moved to a different channel. The cable modem termination system may change the configuration file for the cable modem to be moved to initialize on a specific channel. The cable modem may then be restarted to force the cable modem to initialize on the designated channel. One problem with this method is that it is inefficient. The potentially high number of cable modems that may be connected to a cable system makes the process of changing the channel on individual modems tedious. The administrator may have to individually move a great number of modems to effect any noticeable improvement in the balancing of the load on the cable modem termination systems.

It would be desirable to be able to efficiently adjust the balance of channel usage in a cable system.

SUMMARY OF THE INVENTION

In view of the above, one aspect of the present invention is directed to a system for managing a network. The system includes a plurality of network devices connected to the network. The network devices are addressable as clusters of network devices by a multicast address. A plurality of data channels is provided. Each data channel is operable to provide communications to at least one of the plurality of network devices. The network devices are connected to a server for monitoring the data channel on which each of the first network devices are communicating. The server can also assign the network devices in a selected cluster to a selected data channel.

The server may also be used to determine if the network is unbalanced by the use of only one or a few of the data channels for communication. The server can then be used to move the network devices to different data channels in clusters to achieve a balanced network efficiently.

In a further aspect of the present invention, a method for managing a network is provided. A plurality of network devices is provided for communicating on a plurality of data channels. A network administrator is provided for issuing commands to the network devices. Each network device on the network is registered by assigning the network devices to a plurality of clusters of network devices and by assigning a multicast address to each the network device in each the cluster. A move command is sent to one of the multicast addresses to move the network devices in the cluster addressed by the one of the multicast addresses to a selected data channel.

The network administrator may be used to monitor channel usage to identify when the cable network has become unbalanced. The network may become unbalanced when only one or a few data channels are being used by the network devices. The network administrator may then send the move command to move the cluster or clusters to achieve a more balanced network.

The foregoing and other features and advantages of a preferred embodiment of the present invention will be more readily apparent from the following detailed description, which proceeds with references to the accompanying drawings.

BRIEF DESCRIPTION OF THE DRAWINGS

Presently preferred embodiments of the invention are described below in conjunction with the appended drawing figures, wherein like reference numerals refer to like elements in the various figures, and wherein:

FIG. 2 is a block diagram illustrating a protocol stack for a cable modem;

FIG. 3 is a block diagram illustrating a Telephony Channel Descriptor message structure;

FIG. 4 is a block diagram illustrating a Termination System Information message structure;

FIG. 7 is a flow chart of a method for assigning a cable modem to a cable modem cluster; and FIGS. 8A and 8B is a flowchart for a method of balancing channel load in the cable modem system in FIG. 5

DETAILED DESCRIPTION OF THE PREFERRED EMBODIMENT

The description that follows fully incorporates by reference the following co-pending patent applications: "SYSTEM AND METHOD FOR CABLE MODEM MANAGEMENT", U.S. patent Ser. No. 09/018,404 to John Fijolek et al. (filed Feb. 4, 1998 and assigned to the assignee of the present invention); "METHOD AND SYSTEM FOR PROVIDING QUALITY-OF-SERVICE IN A DATA-OVER-CABLE SYSTEM", U.S. Pat. No. 6,223,222; "METHOD AND SYSTEM FOR PROVIDING QUALITY-OF-SERVICE IN A DATA-OVER-CABLE SYSTEM USING CONFIGURATION PROTOCOL MESSAGING", U.S. patent Ser. No. 09/079,322 to John Fijolek et al. (filed May 14, 1998); and "METHOD AND SYSTEM FOR BUNDLING DATA IN A DATA-OVER-CABLE SYSTEM", U.S. patent Ser. No. 09/085,586 to Nurettin B. Beser (filed May 27, 1998).

A. Cable Modem System

Figure 1:
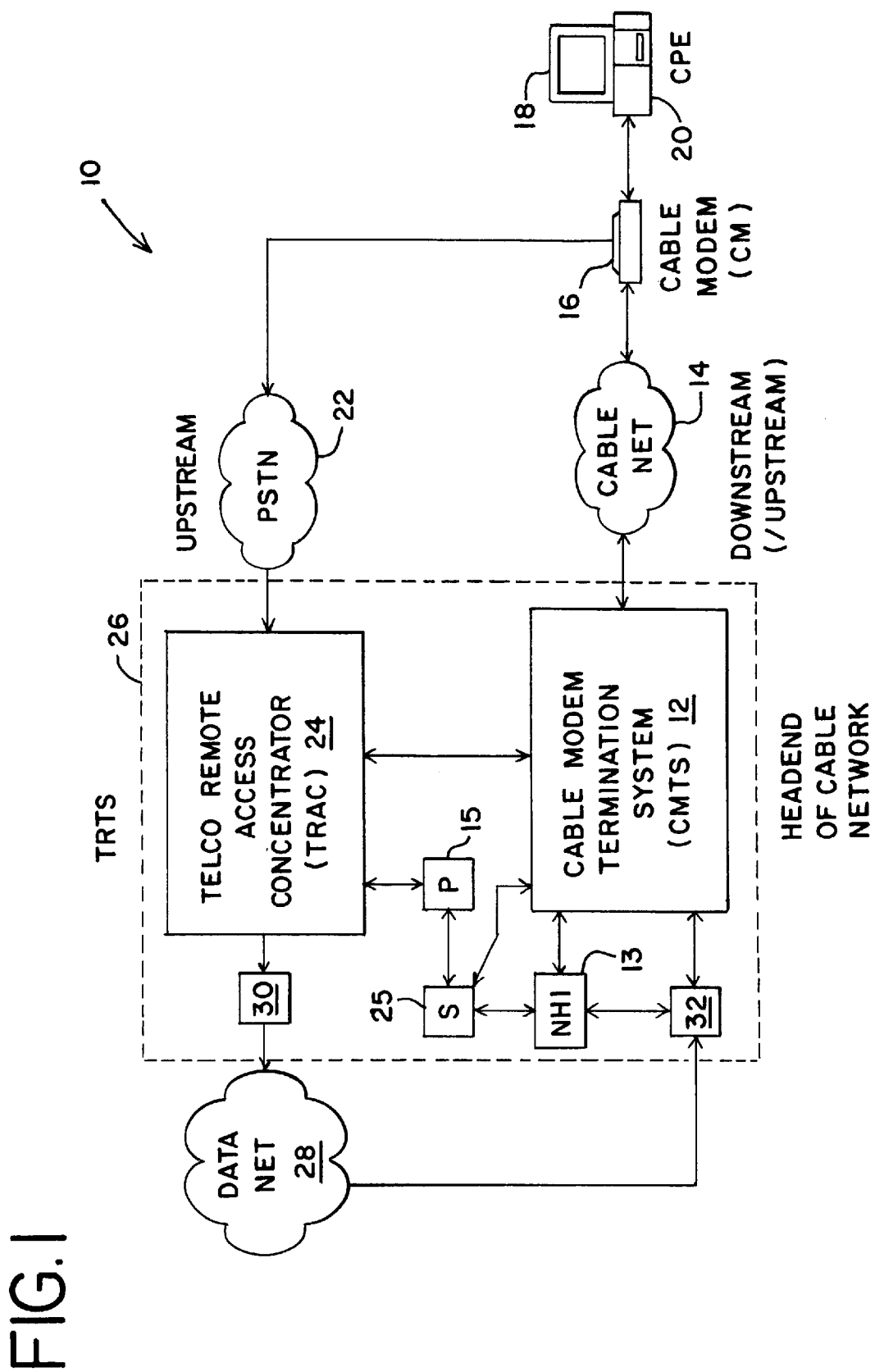
FIG. 1 is a block diagram illustrating a cable modem system with telephony return.

FIG. 1 is a block diagram illustrating a data-over-cable system with telephony return 10, hereinafter data-over-cable system 10. Most cable providers known in the art predominately provide uni-directional cable systems, supporting only a "downstream" data path. A downstream data path is the flow of data from a cable television network "headend" to customer premise equipment (e.g., a customer's personal computer). A cable television network headend is a central location that is responsible for sending cable signals in a downstream direction. A return path via a telephony network ("telephony return") is typically used for an "upstream" data path in uni-directional cable systems. An upstream data path is the flow of data from customer premise equipment back to the cable television network headend.

However, data-over-cable system 10 of the present invention may also provide a bi-directional data path (i.e., both downstream and upstream) without telephony return as is also illustrated in FIG. 1. In a data-over cable system without telephony return, customer premise equipment or cable modem has an upstream connection to the cable modem termination system. The upstream connection may be made via a cable television connection, a wireless connection, a satellite connection, or a connection via other technologies to send data upstream to the cable modem termination system. It is to be understood by one of ordinary skill in the art that preferred embodiments of the present invention may be practiced using cable systems 10 with or without telephone return.

Data-over-cable system 10 includes a Cable Modem Termination System ("CMTS") 12 connected to a cable television network 14, hereinafter cable network 14. FIG. 1 illustrates one CMTS 12. However, data-over-cable system 10 can include multiple CMTS 12. Cable network 14 includes cable television networks such as those provided by Comcast Cable Communications, Inc., of Philadelphia, Pa., Cox Communications, or Atlanta, Ga., Tele-Communications, Inc., of Englewood Colo., Time-Warner Cable, of Marietta, Ga., Continental Cablevision, Inc., of Boston, Mass., and others. Cable network 14 is connected to a Cable Modem ("CM") 16 with a downstream cable connection. Cable modem 16 is any cable modem such as those provided by 3Com Corporation of Santa Clara, Calif., Motorola Corporation of Arlington Heights, Illinois, Hewlett-Packard Co. of Palo Alto, Calif., Bay Networks of Santa Clara, Calif., Scientific-Atlanta, of Norcross, Ga. and others. FIG. 1 illustrates one cable modem 16. However, in a typical data-over-cable system, tens or hundreds of thousands of cable modem 16 are connected to CMTS 12.

Cable modem 16 is connected to Customer Premise Equipment ("CPE") 18 such as a personal computer system via a Cable Modem-to-CPE Interface ("CMCI") 20. Cable modem 16 is connected to a Public Switched Telephone Network ("PSTN") 22 with an upstream telephony connection. PSTN 22 includes those public switched telephone networks provided by AT&T, Regional Bell Operating Companies (e.g., Ameritch, U.S. West, Bell Atlantic, Southern Bell Communications, Bell South, NYNEX, and Pacific Telesis Group), GTE, and others. The upstream telephony connection is any of a standard telephone line connection, Integrated Services Digital Network ("ISDN") connection, Asymmetric Digital Subscriber Line ("ADSL") connection, or other telephony connection. PSTN 22 is connected to a Telephony Remote Access Concentrator ("TRAC") 24.

In a data-over cable system without telephony return, cable modem 16 has an upstream connection to CMTS 12. The upstream connection may be made via a cable television connection, a wireless connection, a satellite connection, or a connection via other technologies to send data upstream outside of the telephony return path. An upstream cable television connection via cable network 14 is illustrated in FIG. 1.

FIG. 1 illustrates a telephony modem integral to cable modem 16. In another embodiment of the present invention, the telephony modem is a separate modem unit external to cable modem 16 used specifically for connecting with PSTN 22. A separate telephony modem includes a connection to cable modem 16 for exchanging data, cable modem 16 includes cable modems provided by the 3Com Corporation of Santa Clara, Calif., U.S. Robotics Corporation of Skokie, Ill., and others. In yet another embodiment of the present invention, cable modem 16 includes functionality to connect only to cable network 14 and receives downstream signals from cable network 14 and sends upstream signals to cable network 14 without telephony return. The present invention is not limited to cable modems used with telephony return.

CMTS 12 and TRAC 24 may be at a "headend" of cable system 10, or TRAC 24 may be located elsewhere and have routing associations to CMTS 12. CMTS 12 and TRAC 24 together are called a "Telephony Return Termination System" ("TRTS") 26. TRTS 26 is illustrated by a dashed box in FIG. 1. CMTS 12 and TRAC 24 make up TRTS 26 whether or not they are located at the headend of cable network 14, and TRAC 24 may in located in a different geographic location from CMTS 12. Content servers, operations servers, administrative servers and maintenance servers used in data-over-cable system 10 and shown as a server 25 may also be in different locations. Access points to data-over-cable system 10 are connected to one or more CMTS's 12 or cable headend access points. Such configurations may be "one-to-one", "one-to-many," or "many-to-many," and may be interconnected to other Local Area Networks ("LANs") or Wide Area Networks ("WANs").

TRAC 24 is connected to a data network 28 (e.g., the Internet or an intranet) by a TRAC-Network System Interface 30 ("TRAC-NSI"). CMTS 12 is connected to data network 28 by a CMTS-Network System Interface ("CMTS-NSI") 32.

Data-over-cable system 10 includes DHCP proxies 15, servers 25 and associated Network Host Interfaces 13 available on CMTS 12. Multiple DHCP proxies 15, servers 25 and network host interfaces 13 are illustrated as single boxes in FIG. 1. FIG. 1 also illustrates DHCP proxies 15 separate from TRAC 24. In one embodiment of the present invention, TRAC 24 includes DHCP proxy functionality and no separate DHCP proxies 15 are used. In such an embodiment, TRAC 24 forwards DHCP messages using a DHCP address field to DHCP servers 160 available on CMTS 12.

The cable system 10 in FIG. 1 includes only one cable modem 16. The cable system 10 may include any number of cable modems 16 connected to the CMTS 12. In addition, the cable system 10 may include any number of CMTS' 12.

B. Cable Modem Protocol Stack

FIG. 2 is a block diagram illustrating a protocol stack 36 for cable modem 16. FIG. 2 illustrates the downstream and upstream protocols used in cable modem 16. As is known in the art, the Open System Interconnection ("OSI") model is used to describe computer networks. The OSI model consists of seven layers including from lowest-to-highest, a physical, data-link, network, transport, session, application and presentation layer. The physical layer transmits bits over a communication link. The data link layer transmits error free frames of data. The network layer transmits and routes data packets.

For downstream data transmission, cable modem 16 is connected to cable network 14 in a physical layer 38 via a Radio Frequency ("RF") Interface 40. In a preferred embodiment of the present invention, RF Interface 40 has an operation frequency range of 50 Mega-Hertz ("MHz") to 1 Giga-Hertz ("GHz") and a channel bandwidth of 6 MHz. However, other operation frequencies may also be used and the invention is not limited to these frequencies. The channels are used in a typical cable network 14 to communicate various services, such as television channels. The cable network 14 includes one or more data channels, which are used to connect cable modems 16 to data network 28.

RF interface 40 uses a signal modulation method of Quadrature Amplitude Modulation ("QAM"). As is known in the art, QAM is used as a means of encoding digital information over radio, wire, or fiber optic transmission links. QAM is a combination of amplitude and phase modulation and is an extension of multiphase phase-shift-keying. QAM can have any number of discrete digital levels typically including 4, 16, 64 or 256 levels. In one embodiment of the present invention, QAM-64 is used in RF interface 40. However, other operating frequencies modulation methods could also be used. For more information on RF interface 40 see the Institute of Electrical and Electronic Engineers ("IEEE") standard 802.14 for cable modems incorporated herein by reference. However, other RF interfaces 40 could also be used and the present invention is not limited to IEEE 802.14 (e.g., RF interfaces from Multimedia Cable Network Systems ("MCNS") and others could also be used).

Above RF interface 40 in a data-link layer 42 is a Medium Access Control ("MAC") layer 44. As is known in the art, MAC layer 44 controls access to a transmission medium via physical layer 38. For more information on MAC layer protocol 44 see IEEE 802.14 for cable modems. However, other MAC layer protocols 44 could also be used and the present invention is not limited to IEEE 802.14 MAC layer protocols (e.g., MCNS MAC layer protocols and others could be used).

Above MAC layer 44 is an optional link security protocol stack 46. Link security protocol stack 46 prevents authorized users from making a data connection from cable network 14. RF interface 40 and MAC layer 44 can be used for an upstream connection if data-over-cable system 10 is used without telephony return.

For upstream data transmission with telephony return, cable modem 16 is connected to PSTN 22 in physical layer 38 via modem interface 48. The International Telecommunications Union-Telecommunication Standardization Sector ("ITU-T", formerly known as the CCITT) defines standards for communication devices identified by "V.xx" series where "xx" is an identifying number.

In one embodiment of the present invention, ITU-T V.34 is used as modem interface 48. As is known in the art, ITU-T V.34 is commonly used in the data link layer for modem communications and currently allows data rates as high as 33,600 bits-per-second ("bps"). For more information, see the ITU-T V.34 standard. However, other modem interfaces or other telephony interfaces could also be used.

Above modem interface 48 in data link layer 42 is Point-to-Point Protocol ("PPP") layer 50, hereinafter PPP 50. As is known in the art, PPP is used to encapsulate network layer datagrams over a serial communications link. For more information on PPP see Internet Engineering Task Force ("IETF") Request for Comments ("RFC"), RFC-1661, RFC-1662 and RFC-1663 incorporated herein by reference.

Above both the downstream and upstream protocol layers in a network layer 52 is an Internet Protocol ("IP") layer 54. IP layer 54, hereinafter IP, roughly corresponds to OSI layer 3, the network layer, but is typically not defined as part of the OSI model. As is known in the art, IP is a routing protocol designed to route traffic within a network or between networks. For more information on IP see RFC-791 incorporated herein by reference.

Internet Control Message Protocol ("ICMP") layer 56 is used for network management. The main functions of ICMP layer 56, hereinafter ICMP 56, include error reporting, reachability testing (e.g., "pinging") congestion control, route-change notification, performance, subnet addressing and others. Since IP is an unacknowledged protocol, datagrams may be discarded and ICMP 56 is used for error reporting. For more information on ICMP 56 see RFC-971 incorporated herein by reference.

Above IP and ICMP 56 is a transport layer 58 with User Datagram Protocol layer 60 ("UDP"). UDP layer 60, hereinafter UDP 60, roughly corresponds to OSI layer 4, the transport layer, but is typically not defined as part of the OSI model. As is known in the art, UDP 60 provides a connectionless mode of communications with datagrams. For more information on UDP 60 see, RFC-768 incorporated herein by reference.

Above the network layer are a Simple Network Management Protocol ("SNMP") layer 62, Trivial File Protocol ("TFTP") layer 64, Dynamic Host Configuration Protocol ("DHCP") layer 66 and a UDP manager 68. SNMP layer 62 is used to support network management functions. For more information on SNMP layer 62 see RFC-1157 incorporated herein by reference. TFTP layer 64 is a file transfer protocol used to download files and configuration information. For more information on TFTP layer 64, see RFC-1350 incorporated herein by reference. DHCP layer 66 is a protocol for passing configuration information to hosts on an IP network. For more information on DHCP layer 66 see RFC-1541 and RFC-2131 incorporated herein by reference. UDP manager 68 distinguishes and routes packets to an appropriate service (e.g., a virtual tunnel). More or few protocol layers could also be used with data-over-cable system 10.

Cable modem 16 supports transmission and reception of IP datagrams as specified by RFC-791. CMTS 12 and TRAC 24 may perform filtering of IP datagrams. Cable modem 16 is configurable for IP datagram filtering to restrict cable modem 16 and CPE 18 to the use of only their assigned IP addresses. Cable modem 16 is configurable for IP datagram UDP 60 port filtering (i.e., deep filtering).

Cable modem 16 forwards IP datagrams destined to an IP unicast address across cable network 14 or PSTN 22. Some routers have security features intended to filter out invalid users who alter or masquerade packets as if sent from a valid user. Since routing policy is under the control of network operators, such filtering is a vendor specific implementation. For example, dedicated interfaces (i.e., Frame Relay) may exist between TRAC 24 and CMTS 12 which preclude filtering, or various forms of virtual tunneling and reverse virtual tunneling could be used to virtually source upstream packets from cable modem 16. For more information on virtual tunneling see Level 2 Tunneling Protocol ("L2TP") or Point-to-Point Tunneling Protocol ("PPTP") in IETF draft documents incorporated herein by reference by Kory Hamzeh, et. al (IETF draft documents are precursors to IETF RFCs and are works in progress).

Cable modem 16 also forwards IP datagrams destined to an IP multicast address across cable network 14 or PSTN 22. Cable modem 16 is configurable to keep IP multicast routing tables and to use group membership protocols. Cable modem 16 is also capable of IP tunneling upstream through the telephony path. A cable modem 16 that wants to send a multicast packet across a virtual tunnel will prepend another IP header, set the destination address in the new header to be the unicast address of CMTS 12 at the other end of the tunnel, and set the IP protocol field to be four, which means the next protocol is IP.

CMTS 12 at the other end of the virtual tunnel receives the packet, strips off the encapsulating IP header, and forwards the packet as appropriate. A broadcast IP capability is dependent upon the configuration of the direct linkage, if any, between TRAC 24 and CMTS 12. CMTS 12, cable modem 16, and TRAC 24 are capable of routing IP datagrams destined to an IP broadcast address which is across cable network 14 or PSTN 22 if so configured. Cable modem 16 is configurable for IP broadcast datagram filtering.

An operating environment for cable modem 16 of the present invention includes a processing system with at least one high speed Central Processing Unit ("CPU") and a memory system. In accordance with the practices of persons skilled in the art of computer programming, the present invention is described below with reference to acts and symbolic representations of operations that are performed by the processing system, unless indicated otherwise. Such acts and operations are sometimes referred to as being "computer-executed", or "CPU executed."

It will be appreciated that the acts and symbolically represented operations include the manipulation of electrical signals by the CPU. The electrical system represent data bits which cause a resulting transformation or reduction of the electrical signal representation, and the maintenance of data bits at memory locations in the memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic disks, and any other volatile or non-volatile mass storage system readable by the CPU. The computer readable medium includes cooperating or interconnected computer readable media, which exist exclusively on the processing system or is distributed among multiple interconnected processing systems that may be local or remote to the processing system.

C. Initialization of Cable Modems

The cable modem 16 includes non-volatile memory for storing configuration file having configuration parameters, or operational parameters, which are parameters that the cable modem 16. The configuration parameters may include factory default settings and parameters that are set during initialization of a connection to the CMTS 12.

The initialization of the connection to the CMTS 12 may begin with a scan for a downstream channel. When a cable modem 16 powers up or is restarted, it attempts to communicate on a downstream channel identified in its configuration file. If one is not included, or if the cable modem is unable to communicate over the designated channel, it scans for an available channel. The cable system 10 may include one or more data channels. The cable modem scans for a channel by tuning to channels successively through the available bandwidth and locking on the first one in which certain characteristics of a signal in a data channel are found. These characteristics may include synchronization of QAM symbol timing, synchronization of Forward Error Control framing, synchronization of MPEG packetization and recognition of the synchronization of MAC messages. If more than one data channel is included, the cable modem will lock on the first one that it finds in the scan.

The steps followed during initialization of the cable modem 16 may depend upon the cable system 10 is uses telephony return or a bi-directional cable connection.

When cable modem 16 is initially powered on, if telephony return is being used, cable modem 16 will receive a Telephony Channel Descriptor ("TCD") from CMTS 12 that is used to provide dialing and access instructions on downstream channels via cable network 14. Information in the TCD is used by cable modem 16 to connect to TRAC 24. The TCD is transmitted as a MAC management message with a management type value of TRI_TCD at a periodic interval (e.g., every 2 seconds). To provide for flexibility, the TCD message parameters are encoded in a Type/Length/Value ("TLV") form. However, other encoding techniques could also be used.

FIG. 3 is a block diagram illustrating a TCD message structure 70 with MAC 44 management header 72 and Service Provider Descriptor(s) ("SPD") 74 encoded in TLV format. SPDs 74 are compound TLV encodings that define telephony physical-layer characteristics that are used by cable modem 16 to initiate a telephone call. SPD 74 is a TLV-encoded data structure that contains sets of dialing and access parameters for cable modem 16 with telephony return. SPD 74 is contained within TCD message 70. There may be multiple SPD 74 encodings within a single TCD message 70. There is at least one SPD 74 in TCD message 70. SPD 74 parameters are encoded as SPD-TLV tuples. SPD 74 contains the parameters shown in Table 1 and may contain optional vendor specific parameters. However, more or fewer parameters could also be used in SPD 74.

TABLE 1

| SPD 74 Parameter | Description |
| --- | --- |
| Factory Default Flag | Boolean value, if TRUE(1), indicates a SPD which should be used by cable modem 16. |
| Service Provider Name | This parameter includes the name of a service provider. Format is standard ASCII string composed of numbers and letters. |
| Telephone Numbers | These parameters contain telephone numbers that cable modem 16 uses to initiate a telephony modem link during a login process. Connections are attempted in ascending numeric order (i.e., Phone Number 1, Phone Number 2 . . . ). The SPD contains a valid telephony dial string as the primary dial string (Phone Number 1), secondary dial-strings are optional. Format is ASCII string(s) composed of: any sequence of numbers, pound "#" and star "*" keys and comma character "," used to indicate a two second pause in dialing. |
| Connection Threshold | The number of sequential connection failures before indicating connection failure. A dial attempt that does not result in an answer and connection after no more than ten rings is considered a failure. The default value is one. |
| Login User Name | This contains a user name cable modem 16 will use an authentication protocol over the telephone link during the initialization procedure. Format is a monolithic sequence of alphanumeric characters in an ASCII string composed of numbers and letters. |
| Login Password | This contains a password that cable modem 16 will use during authentication over a telephone link during the initialization procedure. Format is a monolithic sequence of alphanumeric characters in an ASCII string composed of numbers and letters. |
| DHCP Authenticate | Boolean value, reserved to indicate that cable modem 16 uses a specific indicated DHCP Server (see next parameter) for a DHCP Client and BOOTP Relay Process when TRUE (one). The default is FALSE (zero) which allows any DHCP Server. |
| DHCP Server | IP address value of a DHCP Server cable modem 16 uses for DHCP Client and BOOTP Relay Process. If this attribute is present and DHCP Authenticate attribute is TRUE(1). The default value is integer zero. |
| RADIUS Realm | The realm name is a string that defines a RADIUS server domain. Format is a monolithic sequence of alphanumeric characters in an ACSII string composed of numbers and letters. |
| PPP Authentication | This parameter instructs the telephone modem which authentication procedure to perform over the telephone link. |
| Demand Dial Timer | This parameter indicates time (in seconds) of inactive networking time that will be allowed to elapse before hanging up a telephone connection at cable modem 16. If this optional parameter is not present, or set to zero, then the demand dial feature is not activated. The default value is zero. |
| Vendor Specific Extensions | Optional vendor specific extensions. |

A Termination System Information ("TSI") message is transmitted by CMTS 12 at periodic intervals (e.g., every 2 seconds) to report CMTS 12 information to cable modem 16 whether or not telephony return is used. The TSI message is transmitted as a MAC 44 management message. The TSI provides a CMTS 12 boot record in a downstream channel to cable modem 16 via cable network 14. Information in the TSI is used by cable modem 16 to obtain information about the status of CMTS 12. The TSI message has a MAC 44 management type value of TRI_TSI.

FIG. 4 is a block diagram of a TSI message structure 76. TSI message structure 76 includes a MAC 44 management header 78, a downstream channel IP address 80, a registration IP address 82, a CMTS 12 boot time 84, a downstream channel identifier 86, an epoch time 88 and vendor specific TLV encoded data 90.

A description of the fields of TSI message 76 is shown in Table 2. However, more or fewer fields could also be used in TSI message 76.

TABLE 2

| TSI 76 Parameter | Description |
|---|---|
| Downstream Channel IP Address 80 | This field contains an IP address of CMTS 12 available on the downstream channel this message arrived on. |
| Registration IP Address 82 | This field contains an IP address cable modem 16 sends its registration request messages to. This address MAY be the same as the Downstream Channel IP address. |
| CMTS Boot Time 84 | Specifies an absolute-time of a CMTS 12 recorded epoch. The clock setting for this epoch uses the current clock time with an unspecified accuracy. Time is represented as a 32 bit binary number. |
| Downstream Channel ID 86 | A downstream channel on which this message has been transmitted. This identifier is arbitrarily chosen by CMTS 12 and is unique within the MAC 44 layer. |
| Epoch 88 | An integer value that is incremented each time CMTS 12 is either re-initialized or performs address or routing table flush. |
| Vendor Specific Extensions 90 | Optional vendor extensions may be added as TLV encoded data. |

After receiving TCD 70 message and TSI message 76, cable modem 16 continues to establish access to data network 28 (and resources on the network) by first dialing into TRAC 24 and establishing a telephony PPP 50 session. Upon the completion of a successful PPP 50 connection, cable modem 16 performs PPP Link Control Protocol ("LCP") negotiation with TRAC 24. Once LCP negotiation is complete, the cable modem 16 requests Internet Protocol Control Protocol ("IPCP") address negotiation. For more information on IPCP see RFC-1332 incorporated herein by reference. During IPCP negotiation, cable modem 16 negotiates an IP address with TRAC 24 for sending IP data packet responses back to data network 28 via TRAC 24.

When cable modem 16 has established an IP link to TRAC 24, it begins "upstream" communications to CMTS 12 via DHCP layer 66 to complete a virtual data connection by attempting to discover network host interfaces available on CMTS 12 (e.g., IP host interfaces for a virtual IP connection). The virtual data connection allows cable modem 16 to receive data from data network 28 via CMTS 12 and cable network 14, and send return data to data network 28 via TRAC 24 and PSTN 22. Cable modem 16 must first determine an address of a host interface (e.g., an IP interface) available on CMTS 12 that can be used by data network 28 to send data to cable modem 16. However, cable modem 16 has only a downstream connection from CMTS 12 and has to obtain a connection address to data network 28 using an upstream connection to TRAC 24.

The initialization process continues for all cable modems 16 in a cable system 10 each time a cable modem is re-started. A cable system 10 may include tens of thousands of cable modems 16.

D. Configuration Parameters for Network Administration

Figure 5:
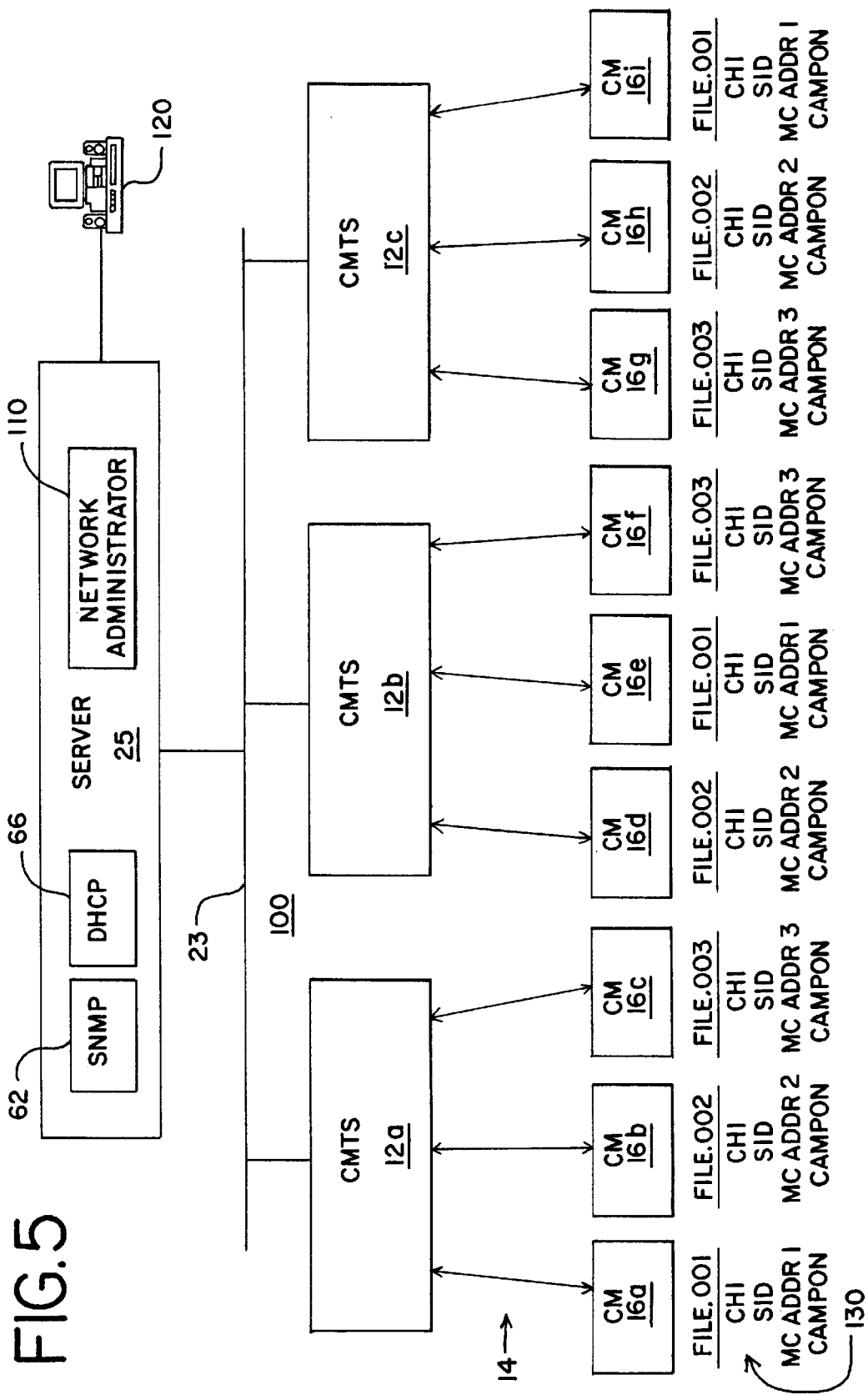
FIG. 5 is a block diagram of a cable modem system showing multiple cable modems and multiple cable modem termination systems with initial configuration settings for the cable modems.

FIG. 5 is a block diagram of a cable system 100 showing multiple CMTS' 12*a–c* connected to multiple cable modems 16*a–i*. The cable system 100 is connected to the server 25 which includes an SNMP manager 62, the DHCP server 66 and a network administrator 110. The server includes an interface to a network management station 120, which may include programs that communicate with the DHCP server 66, the SNMP manager 62 and the network administrator 110.

The server 25 is connected to the CMTS' 12*a–c* over the local network 23, which may include any suitable network (Ethernet, token ring, etc.). The CMTS' 12*a–c* are connected to the cable modems 16*a–i* by cable network 14. FIG. 5 illustrates a bi-directional connection, which represents either a bi-directional network, or a cable network using telephony return.

During initialization, configuration information relating to network management and administration is communicated between the CMTS 12 and the CM 16. The configuration parameters are stored in configuration files 130. Once the initialization and registration functions have been performed, the cable modem 16 and the CMTS 12 stores a copy of the configuration file 130 for the cable modem 16.

The configuration information, or configuration parameters, may include any type of information used by a network administrator 110 to improve the operation of the cable system 10. For example, configuration parameters may be used to provide traffic engineering capabilities to the network administrator 110 such that channel usage may be balanced among cable modems 16 in a system throughout available data channels.

Other types of services may be enabled with configuration parameters. For example, during initialization, individual cable modems request upstream and downstream connections with different Class-of-Service ("CoS") and Quality of Service ("QoS") to/from CMTS 12 on cable network 14. If telephony return is used, then cable modems request downstream CoS and QoS connections from CMTS 12 on cable network 14. As is known in the art, CoS provides a reliable (e.g., error free, in sequence, with no loss of duplication) transport facility independent of the QoS. QoS collectively specifies the performance of the network service that a device expects on a network.

The CoS and QoS connections are requested with a registration message sent from CM 16 to CMTS 12. A quality-of-service bandwidth request includes bandwidth allocated for CoS, QoS and other related parameters and is hereinafter called quality-of-service "bandwidth request". Server 25 (shown in FIG. 1) maintains multiple quality-of-service identifiers allocated with a database (not shown) for CoS and other QoS designations. The multiple quality-of-service identifiers are an indication of CoS, QoS and other related parameters requested by CM 16 and are collectively called "quality-of-service identifiers" for the sake of simplicity.

In addition to the configuration information from the configuration file 130 sent to CMTS 12 by CM 16, one or more of Type-of-Service, Flow Identification Definition, Service Identifier, Multi-cast group or Number of CPEs configuration parameters may be added to the registration request message to request a specific quality-of-service connection. However, more or fewer additional configuration parameters in different formats could also be added to the registration request. CoS, QoS, Type-of-Service, Service IDentifier, Multi-cast group and Number of CPEs configuration parameters in TLV format are illustrated in Tables 3–22. However, other values and layouts could also be used.

Table 3 illustrates exemplary CoS (e.g., class one and class two) in TLV format. However, more or fewer classes of service along with other values could also be used. CoS parameters include maximum downstream data rates in bits-per-second ("bps"), maximum upstream data rate in bps, upstream channel priority, guaranteed minimum data rates in bps, guaranteed maximum data rate in bps and other parameters. Table 3 illustrates CoS values as a TLV Value sub-type, Length Value format. However, other layouts could also be used.

TABLE 3

| Type | Length | Value (sub)type | Length | Value | Description of Value |
|---|---|---|---|---|---|
| 4 | 28 | 1 | 1 | 1 | CoS-1 |
| 4 | 28 | 2 | 4 | 10,000,000 | Maximum forward rate of 10 Mbps |
| 4 | 28 | 3 | 4 | 2,000,000 | Maximum return rate of 2 Mbps |
| 4 | 28 | 4 | 1 | 5 | Return path priority of 5 |
| 4 | 28 | 5 | 4 | 64,000 | Minimum guaranteed rate of 64 kbps |
| 4 | 28 | 6 | 2 | 100 | Maximum transmission burst of 100 mini-slots |
| 4 | 28 | 1 | 1 | 2 | CoS-2 |
| 4 | 28 | 2 | 4 | 5,000,000 | Maximum forward rate of 5 Mbps |
| 4 | 28 | 3 | 4 | 1,000,000 | Maximum return rate of 1 Mbps |
| 4 | 28 | 4 | 1 | 3 | Return priority path of 3 |
| 4 | 28 | 5 | 4 | 32,000 | Minimum guaranteed rate of 32 kbps |
| 4 | 28 | 6 | 2 | 50 | Maximum transmission burst of 50 mini-slots |

QoS parameters include transit delay expected to deliver data to a specific destination, the level of protection from unauthorized monitoring or modification of data, cost for delivery of data, expected residual error probability, the relative priority associated with the data and other parameters.

Table 4 illustrates QoS parameters as Flow Identifiers in TLV format. However, more or fewer flow identifiers could also be used.

TABLE 4

| Type/Subtype | Length | Description of Value |
|---|---|---|
| Ax | N | Flow Class Definition Header |
| A0 | 4 | Flow Class Identifier |
| A1 | 1 | Flow Type |
| A2 | 1 | Ethernet precedence and TOS |
| A3 | 1 | ATM flow subtype |
| A4 | 6 | Minimum number of bytes/sec |
| A5 | 6 | Maximum number of bytes/sec |
| A6 | N | Cell Error Ratio |
| A7 | N | Cell Loss Ratio |
| A8 | N | Cell Mis-insertion Rate |
| A9 | N | Mean Cell Transfer Delay |
| A10 | N | Cell Variation Delay |
| A11–A127 | N | Reserved |
| A128–A255 | N | Vendor Specific |

Table 5 illustrates Type-Of-Service sub-TLV information for QoS parameters. However, more or fewer TOS parameters could also be used.

TABLE 5

| Type of Service (TOS) | Bit-0 | Bit-1 | Bit-2 | Bit-3 | Decimal Value |
|---|---|---|---|---|---|
| Maximize Delay | 1 | 0 | 0 | 0 | 1 |
| Maximize Throughput | 0 | 1 | 0 | 0 | 2 |
| Maximize Reliability | 0 | 0 | 1 | 0 | 4 |
| Minimize Cost | 0 | 0 | 0 | 1 | 8 |
| Normal Service | 0 | 0 | 0 | 0 | 0 |

Table 6 illustrates Flow Identifier Values (Type A0, Table 4). However, more or fewer flow identifier values could also be used.

TABLE 6

| Flow Identifier Value (4-bytes) | Definition of Value |
|---|---|
| 0 | The packet is to be sent to the network without any special treatment. |
| 1 | The packet is to be sent to the network using a precedence (i.e., priority) and TOS. |
| 2 . . . 255 | Reserved. |

Table 7 illustrates Flow type (Type A1, Table 4). However, more or fewer flow types could also be used.

TABLE 7

| Flow type | Definition |
|---|---|
| 1 | IP 54 |
| 2 | ATM |
| 3 . . . 255 | Reserved |

Table 8 illustrates Asynchronous Transport Mode ("ATM") Flow sub-type (Type A3, Table 11). However, more or fewer ATM flow sub-types could also be used.

TABLE 8

| ATM Flow Sub-type | Definition |
|---|---|
| 1 | Universal Bit Rate ("UBR") |
| 2 | Constant Bit Rate ("CBR") |
| 3 | Adaptable Bit Rate ("ABR") |
| 4 | Variable Bit Rate ("VBR") |

CM 16 adds Service IDentifiers ("SIDs") to the registration message sent to CMTS 12. SIDs provide device identification, QoS and CoS management. In particular, they are integral to bandwidth identification. A SID defines a particular mapping between CM 12 and CMTS 16. This mapping is the basis on which bandwidth is allocated to CM 16 by CMTS 12 CoS and QoS is implemented. Within MAC 44, SIDs are unique and CMTS 12 may assign one or more SIDs to each CM 16, corresponding to the CoS or QoS required by CM 16. Table 9 illustrates SID parameters in TLV format. However, more or fewer SID parameters could also be used.

TABLE 9

| Type/Subtype | Length | Description of Value | Default Value |
|---|---|---|---|
| Bx | N | Service Identifier Header | |
| B0 | 1 | Service Identifier Type | 0 |
| B1 | 1 | Number of Service Identifier's (SIDs) to be given with this definition | 1 |
| B2 | 4 | Flow Identifier for SIDs | 0 |
| B3 | 4 | CoS for SIDs | 0 |
| B4 | 4 | Source IP 54 address | CM's IP 54 address |
| B5 | 4 | Source IP 54 address mask | 255.255.255.255 |
| B6 | 4 | Destination IP 54 address | 255.255.255.255 |
| B7 | 4 | Destination IP 54 address mask | 255.255.255.255 |
| B8 | 1 | IP Protocol Type | 256 |
| B9 | 4 | Source Port (Start) | 0 |
| B10 | 4 | Source Port (End) | 65,535 |
| B11 | 4 | Destination Port (Start) | 0 |
| B12 | 4 | Destination Port (End) | 65,535 |
| B13 | 1 | Precedence and TOS | 0 |
| B14 | 1 | Precedence and TOS Mask | 255 |
| B15 | N | Multicast group definition | Null string "" |
| B16 | 4 | Protocol Type | 0xffffffff |
| B17–B127 | N | Reserved | |
| B128–B255 | N | Vendor Specific | |

Table 10 illustrates multicast and unicast Service Identifier Type (Type B0, Table 9) values. However, more or fewer service identifier types could also be used.

TABLE 10

| Service Identifier Type Value | Value Definition |
|---|---|
| 1 | Outgoing unicast from CM 16 |
| 2 | Outgoing multicast from CM 16 |
| 3 | Incoming unicast to CM 16 |
| 8 | Outgoing multicast to CM 16 |

Table 11 illustrates IP Protocol Type values (Type B8, Table 9). However, more or fewer IP protocol types could also be used.

TABLE 11

| IP Protocol Type Value | Value Definition |
|---|---|
| 1 | ICMP 56 |
| 2 | Transmission Control Protocol ("TCP") |
| 4 | UDP 60 |
| 256 | Any Protocol |

Table 12 illustrates Protocol Type values (Type B16, Table 16). However, more or fewer protocol types could also be used.

TABLE 12

| Protocol Type Value | Value Definition |
|---|---|
| 0 | No Protocols Allowed |
| 1 | IP 54 |
| 2 | Internet Packet eXchange ("IPX") |
| 4 | Appletalk |
| 8 | ATM |
| 0xffffffff | All protocols allowed |

Table 13 illustrates the Number of CPEs 18 that can connect to CM 16 during a session. However, more or fewer number of CPEs could also be used.

TABLE 13

| Type | Length | Description of Value | Default |
|---|---|---|---|
| H | 2 | Number of CPEs 18 that can connect to CM 16 during a session | 1 = CPE 18 or 0xffffffff = any number of CPEs 18 |

In a preferred embodiment, cable modems 16 are assigned to clusters of cable modems 16 that may be addressed by a single multicast command. Table 14 includes the information used to assign the cable modem 16 to a cluster of cable modems 16.

TABLE 14

| TYPE | LENGTH | DESCRIPTION |
|---|---|---|
| 4vs$_1$ | 3 | Configuration file name extension for all cable modems in a defined cluster (0–3 chars). |
| 4vs$_2$ | 2 | Cluster SID (14 LSB) |
| 4vs$_3$ | 4 | Cluster IP multicast address |
| 4vs$_5$ | 4 | Camp-on user (0 - nocamp-on, other-maximum seconds to wait for inactivity of cable modem). |

The network administrator 110 in the server 25 organizes the cable modems 16 in clusters of a predetermined size. The server 25 identifies clusters by naming the configuration file 130 for all cable modems 16 in a cluster using the same extension name. For example, the network administrator 110 may define a first cluster of a number of cable modems 16 by assigning a file name of FILE.001 to each cable modem 16 where "FILE" may be any string of any number of characters and where the extension ".001" denotes that the cable modem 16 belongs the first cluster. The network administrator 110 in the server 25 may set the size of the cluster by selecting a number of cable modems 16 to assign to each cluster. FIG. 5 shows three clusters defined by FILE.001, FILE.002 and FILE.003.

The network administrator 110 may identify a multicast address for each cluster defined in the cable system 10. The multicast address is used to issue single commands to the clusters. In a preferred embodiment, the network administrator 110 may use one command to move a cluster of cable modems 16 from one channel to another channel. The cluster advantageously replaces the need to issue individual commands to each cable modem 16 in the cluster.

When a cable modem 16 channel is changed, it is re-initialized using a restart command. If the channel move is made once the cable modems have begun to communicate data, the restart command may come while the cable modem is communicating data. The restart command cannot be executed until the cable modem 16 is inactive. In a preferred embodiment, the restart command may camp-on, or wait for an indication of inactivity from the cable modem 16. The camp-on user parameter in Table 14 defines a wait-time, which is the maximum amount of time that a restart command may wait for an indication of inactivity from the cable modem 16. In a preferred embodiment, a MIB object is defined for re-initializing the cable modem when a set-request command (SNMP command) sets the MIB object to restart.

The cable system 100 in FIG. 5 includes multiple data channels, which include CH1, CH10 and CH20. The block diagram in FIG. 5 shows the cable system 100 with configuration files 130 identified for the cable modems 16a–i. The configuration files 130 shown in FIG. 5 show that the majority of the cable modems 16a–i have locked on to CH1. The configuration files 130 also show that two cable modems 16b and 16f have locked on CH20 and that no cable modems have locked on CH10.

A cable network administrator may want to balance the channels used by the cable modems on the system such that the data channels available, CH1, CH10 and CH20, are used more evenly by the cable modems 16a–i. In the cable system 100 in FIG. 5, the cable modems 16a–i may have had a channel set by scanning the spectrum for available data channels. Cable modems 16a–i typically select the first data channel found during the scan. In the cable system 100 in FIG. 5, the majority of cable modems 16a–i found CH1 first, which may be a typical scenario if the cable modems 16a–i typically use the same or a similar algorithm for finding data channels.

One advantage of the ability to assign cable modems to clusters is that the cable modems may be moved in groups (i.e. the clusters). This ability is particularly advantageous in cable systems having a number of cable modems that is sufficiently large to make it burdensome to move cable modems one at a time. A move command may be issued, for example at the network management station 120, via the network administrator 110, that would re-assign clusters to different channels.

Figure 6:
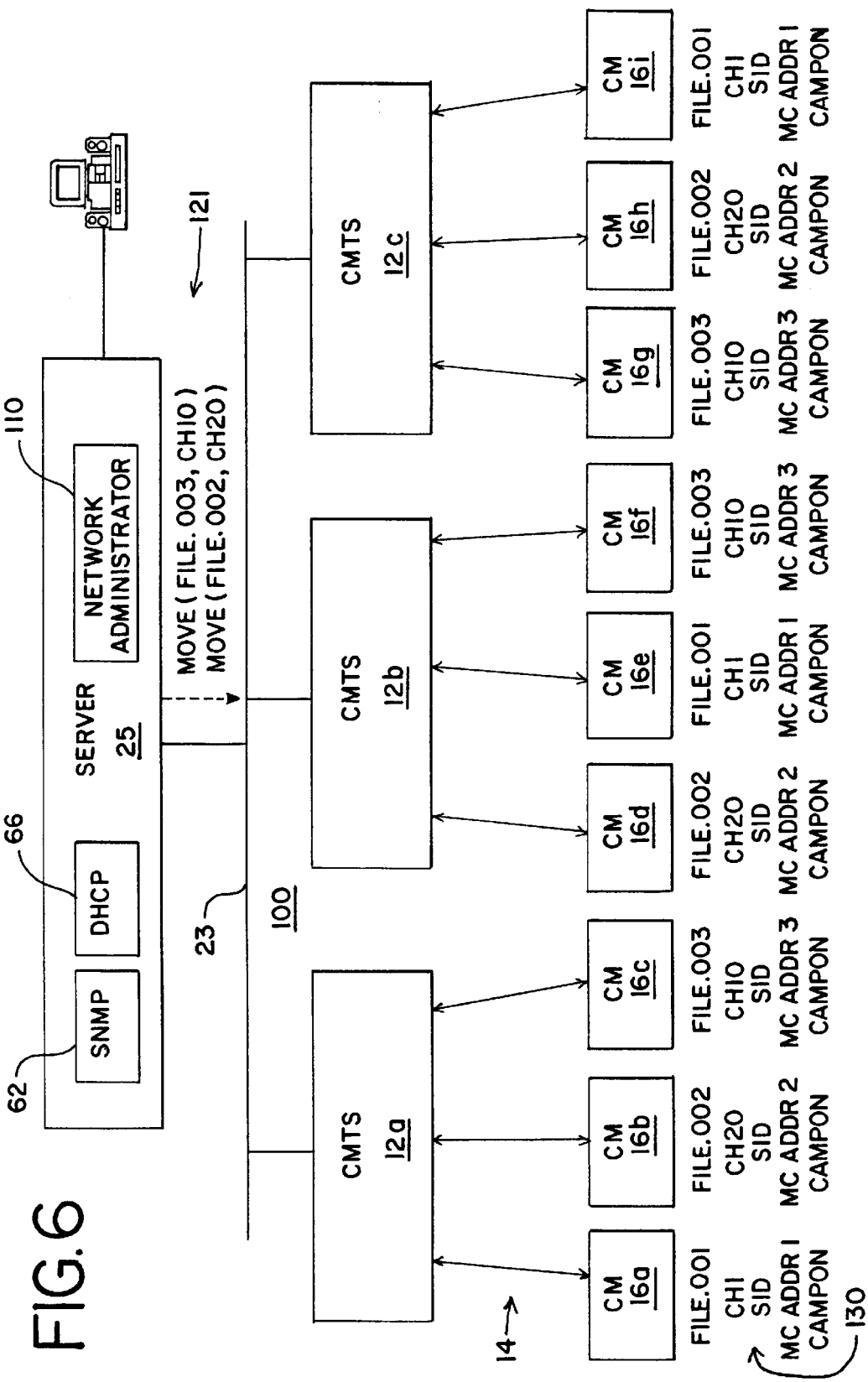
FIG. 6 is a block diagram of the cable modem system in FIG. 5 showing configuration settings after a channel move.

FIG. 6 is a block diagram showing the cable system 100 of FIG. 5 and examples of the configuration files 130 after a set of move commands. The move commands, shown at 121, are being issued to re-assign the clusters identified by the extensions of the configuration file names FILE.003 and FILE.002 to channel CH10 and CH20, respectively. The commands are communicated through the appropriate CMTS 12a, 12b or 12c to all of the cable modems having the configuration file name extensions of .002 and .003. The command is typically communicated to the cable modems 16c, 16f, 16g using the multicast addresses (i.e. MC Addr2 and MC Addr3) defined in the configuration files 130 for cable modems 16c, 16f, 16g. The move command may be followed by a restart command to force the cable modems 16c, 16f, 16g to lock on to the re-assigned data channel, although in an alternative embodiment, the cable modems may perform a re-start when they are re-assigned.

As shown in FIG. 6, the cable modems 16c, 16f, 16g have been re-assigned to channel CH10 and the cable modems 16b, 16d and 16h have been re-assigned to channels CH20. The usage of the available data channels is more balanced after only one command. Three cable modems 16c, 16f, 16g are assigned to CH10, three cable modems 16a, 16e, 16i are assigned to channel CH1 and three cable modems 16b, 16d, 16h are assigned to channel CH20.

In a preferred embodiment, the move command at 121 may be performed using an SNMP manager which communicates with the SNMP server 62. The SNMP manager may execute commands similar to the commands in Table 15 for the MOVE (FILE.003, CH10) command at 121.

TABLE 15

Destination Address = MC Addr3
Change_Channel (FILE.003, CH10)
Source = SNMP

The Change_Channel command in TABLE 15 may trigger the SNMP commands shown in TABLE 16.

TABLE 16

Set-Request (Downstream Channel ID)
Set-Request (Downstream Channel IP Address)
Set-Request (Downstream Channel)

The commands shown in TABLE 15 are preferably invoked using a network manager program in the network management station 120. Such a program may include a user-friendly user interface that provides ways of executing commands and program such as the ones in TABLE 15 through a graphical user interface. In a preferred embodiment, the CHM™ (Cable Headend Manager) from 3Com may be used for network management. SNMP commands may also be used to trigger changes to the configuration files. Commands that write to files may be used to change the files locally and the TFTP may be used to change remotely stored configuration file. The CHM, or suitable alternative, may also provide channel usage information. For example, the CHM may include a command that requests statistics for the usage of Channel 10. In response, the CHM may use SNMP commands to retrieve the information necessary to provide graphical and tabular reports of the usage of Channel 10. The information is then used to determine whether it is necessary to balance the usage of the channels.

Alternatively, DHCP registration request command from the DHCP server 66 or by other DHCP commands for re-configuring the bandwidth usage of the cable modems 16a–i may also be used.

It is to be understood by one of skill in the art that the clusters may be defined for re-assigning cable modems to different downstream channels, and in a bi-directional cable system, to different upstream channels.

E. Methods for Managing Channel Usage in a Cable System

FIG. 7 is a flowchart for a method of initializing one of the cable modems 16a–i (shown in FIG. 5) that is to be assigned to a cluster of cable modems. The cable modem 16 is one of a group of cable modems 16a–i in a cable system 100 in which multiple data channels are available for operation in a data-over-cable system.

The initialization of the cable modem 16 begins at step 150 with the search by the cable modem 16 of a downstream channel. If the cable modem 16 has been previously configured, the cable modem 16 has a downstream channel designated for it in its configuration file. The cable modem 16 will attempt to lock on the downstream channel designated in its configuration parameters. If the cable modem is unable to lock on the downstream channel in its configuration file, the cable modem will scan the spectrum for an available data channel. The cable modem 16 will also scan the spectrum for a downstream channel if the cable modem 16 has not been previously configured or if its configuration parameters have been erased or reset.

At step 152, the cable modem 16 receives information for communicating in the upstream direction. The cable modem 16 may receive an Upstream Channel Descriptor, which provides the cable modem 16 with synchronization and upstream bandwidth allocation in a system that does not use telephony return. The upstream channel descriptor may also include channel change information for forcing the cable modem 16 to change the upstream channel on which it is transmitting. If a system that does use a telephony return, the cable modem 16 receives the TCD discussed above with reference to FIGS. 3 and 4.

At step 154, the cable modem 16 receives the terminal system information message (TSI) discussed above. The TSI is used to provide the cable modem 16 with information about the CTMS 12 to which the cable modem 16 is connected.

At step 155, the cable modem 16 receives information regarding the network host interface. At step 156, the cable modem 16 sends a registration request command to the CMTS 12. The registration request includes a configuration parameters that the CMTS 12 uses to build a configuration file 130 for the cable modem 16. At step 158, the cable modem 16 receives the configuration file 130 from the CMTS 12. The configuration file 130 includes the configuration file name and a multicast address. The cable modem 16 then creates a data connection with the CMTS 12 at step 160.

FIG. 8A is a flowchart for a method for managing the data channel usage in the cable modem system 100 of FIG. 5. The method in FIG. 8A advantageously provides the network administrator the capability of monitoring data channel traffic usage and of balancing the channel usage when too many cable modems have locked on to the same channel or channels. The method of FIG. 8A may be performed by the network administrator 110 and use resources such as DHCP 66, SNMP 62 and the CMTS 12.

The method of FIG. 8A begins at step 170 by looking up the channels used by the cable modems in the cable modem system. A user at the network management station 120 may invoke a network management program to analyze the channel usage in the system. The channel usage is checked to determine if it is unbalanced at decision block 172. If the channel usage is not unbalanced, the method in FIG. 8A proceeds to the end. If the channel usage is unbalanced, the network administrator 110 decides at step 174 which cluster or clusters may be moved to achieve more of a balance. The network administrator 110 multicasts a move command to the selected cluster to move the cluster to a different data channel at step 176. The restart command is also multicast at step 178.

At decision block 180, the cable modem is checked to determine if it is communicating. If it is communicating, the restart command waits at step 182 for the wait-time in the configuration file. In FIG. 8B, the cable modem checks at decision block 192 to determine if it has become inactive before the expiration of the wait time in step 182. If the wait-time had not expired when the cable modem became inactive, the cable modem is restarted at step 194. If the wait-time expired, an error is indicated at step 196.

While the invention has been described in conjunction with presently preferred embodiments of the invention, persons of skill in the art will appreciate that variations may be made without departure from the scope and spirit of the invention. This true scope and spirit is defined by the appended claims, interpreted in light of the foregoing.

We claim:

1. A system for managing a network comprising:
   a plurality of network devices connected to the network and arranged as clusters of network devices, wherein each network device of said plurality of network devices is arranged within one of the clusters of network devices, each of said clusters of network devices being addressable by a respective multicast address;
   a plurality of data channels, each said data channel being operable to provide communications to at least one of said plurality of network devices; and
   the plurality of network devices being connected to a server for monitoring the data channel on which each of said plurality of network devices are communicating and for each given cluster of network devices, the server assigning network devices of the given cluster to one of the plurality of data channels using the given cluster's multicast address.

2. The system of claim 1 wherein each of said network devices includes a plurality of configuration parameters for defining communications information about said network devices wherein one of said configuration parameters includes the multicast address.

3. The system of claim 2 further comprising a Dynamic Host Configuration Protocol (DHCP) server for providing configuration parameters.

4. The system of claim 2 wherein said configuration parameters are maintained in a plurality of configuration files.

5. The system of claim 4 wherein said configuration files are identified by a filename, said filename comprising a filename extension, wherein each of said network devices having the configuration file named by filenames having substantially the same filename extension is in the same cluster.

6. The system of claim 1 further comprising a network management station for issuing commands to configure said network devices.

7. The system of claim 1 wherein said plurality of data channels include downstream channels for providing data to the network devices on a bandwidth and wherein data is communicated from the network devices over a telephone connection.

8. The system of claim 1 wherein said plurality of data channels include downstream channels for providing data to the network devices on a first bandwidth and upstream channels for providing data from the network devices on a second bandwidth.

9. A method for managing a network comprising the steps of:
   providing a plurality of network devices for communicating on a plurality of data channels and a network administrator for issuing commands to said network devices;
   registering each said network device on said network, said registering step comprising the steps of:
      assigning said network devices to a plurality of clusters of network devices; and
      assigning a multicast address to each said cluster such that a given multicast address identifies all network devices in a given cluster; and sending a move command to one of said multicast addresses to move the network devices in the cluster addressed by said one of said multicast addresses to a selected data channel.

10. The method of claim 9 further comprising the steps of:

analyzing the data channel which the network devices are communicating; and performing said step of sending the move command when a few of said network devices are communicating on the selected data channel while many of said network devices are communicating on a few data channels.

11. The method of claim 9 further comprising the steps of:

initializing each of said network devices by the steps of:
scanning a bandwidth for available data channels;
synchronizing communication on a first data channel;
receiving upstream channel description parameters at each network device; and
receiving network communication information for communicating with a network host.

12. The method of claim 9 wherein the step of registering said network devices further comprises the steps of:

receiving a registration request from at least one of said network device, said registration request comprising a plurality of configuration parameters; and responding to said registration request by sending a configuration file comprising said configuration parameters and said multicast address.

13. The method of claim 12 wherein the step of assigning said network devices to clusters comprises the step of:

setting a file name for each said configuration file for each said network device, said file name comprising a cluster identification.

14. The method of claim 13 wherein said setting a file name step includes the step of using a file extension to provide said cluster identification.

15. The method of claim 9 further comprising the step of sending a restart command to each said network device in the cluster moved to the selected channel.

16. The method of claim 15 further comprising the step of the network device waiting to restart when said network device is communicating data.

17. The method of claim 16 further comprising the step of providing a camp-on parameter to each said network device.

18. The method of claim 16 wherein the step of waiting to restart includes the step of waiting for a wait-time.

* * * * *